Dec. 23, 1924.
H. T. CHINN
SAW
Filed July 21, 1922
1,520,330
2 Sheets-Sheet 1
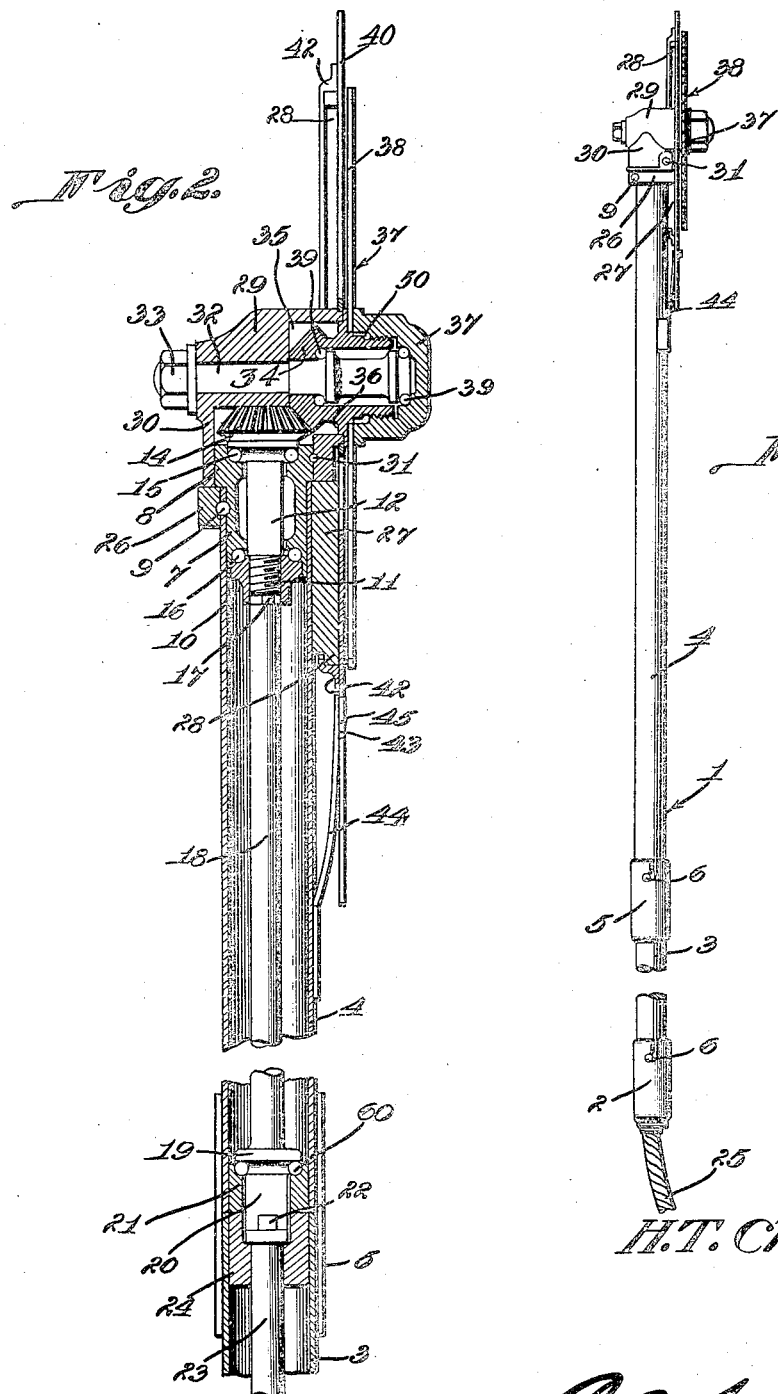
H. T. Chinn,
Inventor
By C. A. Snow & Co.
Attorney Dec. 23, 1924.
H. T. CHINN
SAW
Filed July 21, 1922  2 Sheets-Sheet 2
1,520,330
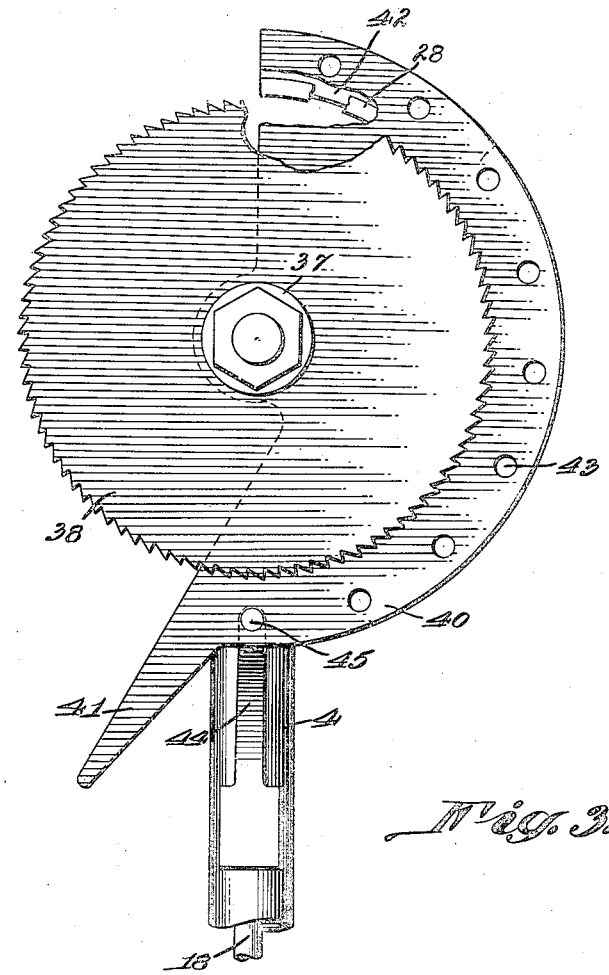
Fig. 3.
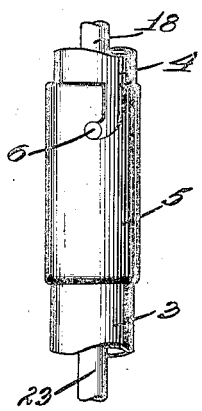
H. T. Chinn,
Inventor
By C. A. Snow & Co.
Attorney Patented Dec. 23, 1924.

1,520,330

UNITED STATES PATENT OFFICE.

HOWARD T. CHINN, OF FLORIN, CALIFORNIA.

SAW.

Application filed July 21, 1922. Serial No. 576,590.

*To all whom it may concern:*

Be it known that I, HOWARD T. CHINN, a citizen of the United States, residing at Florin, in the county of Sacramento and State of California, have invented a new and useful Saw, of which the following is a specification.

The device forming the subject matter of this application is adapted to be employed primarily for pruning trees and the like and includes a rotary saw, novel means being provided for imparting rotation to the saw, the saw being protected by a guard comprising a rest, the guard being circumferentially adjustable to dispose the rest in different positions, novel means being provided for holding the guard in any position to which it may have been adjusted.

It is within the province of the disclosure to improve generally and to enhance the utility of devices of that type to which the application appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a longitudinal section wherein parts are broken away; Figure 3 is an elevation wherein parts are broken away.

The device forming the subject matter of this application includes a handle 1 comprising a socket 2 and any desired number of sections 3 and 4, the construction being such that the handle may be of any desired length. The section 3 has a socket 5 receiving the section 4, the section 3 being received in the socket 2, the parts being held together by pin and bayonet slot connections 6, or in any desired way, so that the handle may be lengthened or shortened at the will of an operator, thereby enabling the saw, hereinafter alluded to, to be used on trees of different heights and under other conditions which will suggest themselves to the user.

A bearing 7 is mounted in the upper end of the handle section 4 and has an outstanding flange 8 the bearing being held in the section 4 by a pin 9 mounted in the said section. A collar 10 is journaled in the bearing 7 and is threaded or held otherwise, as at 11 on the stub shaft 12 provided at its upper end with a beveled gear 14. Balls 15 or other anti-friction elements are interposed between the beveled gear 14 and the bearing 7. The balls 15 are interposed between the bearing 7 and the collar 10. The shaft 12 is detachably connected at 17 with a shaft 18 provided at its lower end with a collar 19 having an extension 20 journaled in a bearing 21 carried by the lower end of the handle section 4, anti-friction balls 60 being interposed between the collar 19 and the bearing 21. The member 20 is detachably connected at 22 with a shaft 23 journaled in a bearing 24 mounted in the upper end of the handle section 4. A flexible shaft 25 extends into the socket 2 and may be connected in any suitable way with the shaft 23.

The upper end of the handle section 4 abuts against the flange 8 on the bearing 7 and the flange 8 extends over a collar 26 mounted on the handle section 4 and including a depending arm 27 extended downwardly along the handle section 4, the arm 27 being provided at its lower end with an upwardly extended semi-circular guide 28. The numeral 29 denotes a transverse bearing having a neck 30 surrounding the bearing 7 and held thereon by a pin 31 or otherwise. A shaft 32 is held in the bearing 29 by a nut 33. A beveled gear 34 meshes with the beveled gear 14 and is journaled on the shaft 32, the beveled gears 34 and 14 being located in the recess 35 formed in the bearing 29. The beveled gear 34 has a neck 50 provided with an upstanding flange 36. A cap 37 is threaded on the neck 50 of the beveled gear 34. A saw 38 is mounted on the neck and is bound against the flange 36 by the cap 37 so that when the beveled gear 34 is rotated, the saw will be rotated also. Balls 39 are located in the neck 50 of the beveled gear 34 and in the cap 37 and cooperate with the outer end of the shaft 32 to support the beveled gear, the cap and the saw antifrictionally for rotation.

The numeral 40 marks a guard which is in the form of an approximately semi-circular metal plate, the guard 40 being mounted to rock on the forward end of the bearing 29, and being held thereon by the outermost portion of the flange 36 of the beveled gear 34. Adjacent to its lower end, the guard 40 has an angularly disposed outstanding rest 41. At its rear side, the guard 40 carries an approximately semi-circular flange 42 which overhangs the guard 28 and steadies and holds the guard in place for swinging movement in a direction at right angles to the axis of the shaft 32. The guard 40 has circumferentially spaced openings 43. A spring latch 44 is mounted on the handle section 4 and includes a projection 45 adapted to be received in the openings 43 of the guard 40.

In practical operation, the limb of a tree or the like is placed against the rest 41 and is severed by the action of the saw 38, rotation being imparted to the saw, from the shaft 25—23—18—12 by way of the beveled pinions 14 and 34. The projection 45 on the latch 44 may be disengaged from the opening 43 in the guard 40 and, then the guard may be shifted circumferentially, to dispose the rest 41 in any desired position, the projection 45 on the latch 44 being again engaged with one of the openings 43 in the guard. Thus, the rest 41 may be shifted so that it will always be in a proper position to cooperate with the branch or the like which is to be cut off by the saw 38.

What is claimed is:

1. In a device of the class described, a handle; a driven shaft carried by the handle; a fixed shaft carried by the handle and disposed at right angles to the driven shaft; intermeshing beveled pinions, one of which is journaled on the fixed shaft, the other of which is assembled with the driven shaft; a saw mounted on the first specified pinion; a guard mounted to swing on the handle in a direction parallel to the saw and provided with a projecting rest; and means for holding the guard in adjusted positions.

2. In a device of the class described, a handle; a saw journaled for rotation on the handle; means for imparting rotation to the saw; a guard mounted to swing on the handle in a plane parallel to the saw and provided with a projecting rest, the guard having a plurality of openings; and a latch on the handle, the latch being adapted to be engaged in any of the openings of the guard.

3. In a device of the class described, a handle; a saw journaled for rotation on the handle; means for rotating the saw; an arcuate guide projecting from the handle and slidably supported on the guide; a guard mounted to rock on the handle; the guard being equipped with a projecting rest defining an angle with the periphery of the saw; and means for holding the guard in adjusted positions.

In testimony that I claim the foregoing as my own, I have hereto affixed my signature in the presence of two witnesses.

HOWARD T. CHINN.

Witnesses:
 MAY GRIFFIN,
 EMMA L. SHACKELFORD.